(12) United States Patent
Jonas

(10) Patent No.: US 6,852,052 B2
(45) Date of Patent: Feb. 8, 2005

(54) GUIDE CHANNEL

(75) Inventor: Michael Jonas, Hennef (DE)

(73) Assignee: Igus Spritzgussteile für die Industrie GmbH, Köln (DE)

( * ) Notice: Subject to any disclaimer, the term of this patent is extended or adjusted under 35 U.S.C. 154(b) by 0 days.

(21) Appl. No.: 10/228,419

(22) Filed: Aug. 27, 2002

(65) Prior Publication Data

US 2003/0008740 A1 Jan. 9, 2003

Related U.S. Application Data

(63) Continuation of application No. 09/471,989, filed on Dec. 23, 1999, now abandoned.

(30) Foreign Application Priority Data

Dec. 31, 1998 (DE) ...................... 298 23 135 U

(51) Int. Cl.[7] ........................... F16G 13/16; F16G 13/18
(52) U.S. Cl. ..................... 474/144; 474/206; 59/78.1; 59/900
(58) Field of Search .................... 474/144, 146, 474/147, 213, 202, 901; 59/78.1, 84, 78, 900; 248/49, 51, 52, 68.1

(56) References Cited

U.S. PATENT DOCUMENTS

| | | | |
|---|---|---|---|
| 3,098,349 A | 7/1963 | Waninger | 474/206 |
| 3,157,376 A * | 11/1964 | Merker et al. | 248/49 |
| 3,503,579 A | 3/1970 | Kurlandsky | 474/206 |
| 3,848,407 A * | 11/1974 | Moritz | 59/78.1 |
| 3,994,373 A | 11/1976 | Loos et al. | 191/12 C |
| 4,570,437 A * | 2/1986 | Moritz | 59/78.1 |
| 4,962,639 A | 10/1990 | Blase | 59/78.1 |
| 4,988,838 A | 1/1991 | Kirtland | 59/78.1 |
| 5,220,779 A | 6/1993 | Tatsuta et al. | 59/78.1 |
| 5,240,209 A | 8/1993 | Kutsch | 59/78.1 |
| 5,257,961 A | 11/1993 | Wehler et al. | 474/144 |
| 5,836,148 A | 11/1998 | Fukao | 59/78.1 |
| 6,367,238 B1 * | 4/2002 | Fischer | 59/78.1 |

FOREIGN PATENT DOCUMENTS

| | | |
|---|---|---|
| DE | 195 12 105 | 8/1996 |
| DE | 296 10 067 | 10/1996 |
| DE | 296 13 678 | 11/1996 |
| DE | 297 06 670 | 7/1997 |
| EP | 0 277 389 | 8/1988 |
| EP | 0 878 640 | 11/1998 |

* cited by examiner

*Primary Examiner*—Marcus Charles
(74) *Attorney, Agent, or Firm*—Drinker Biddle & Reath LLP

(57) ABSTRACT

A guide channel for energy guiding chains which can be mounted on a base structure, has parallel, lateral guide elements extending in the longitudinal direction of the guide channel, between which an energy guiding chain can rest and bottom guide elements, on which the lower strand of an energy guide chain can rest.

21 Claims, 4 Drawing Sheets

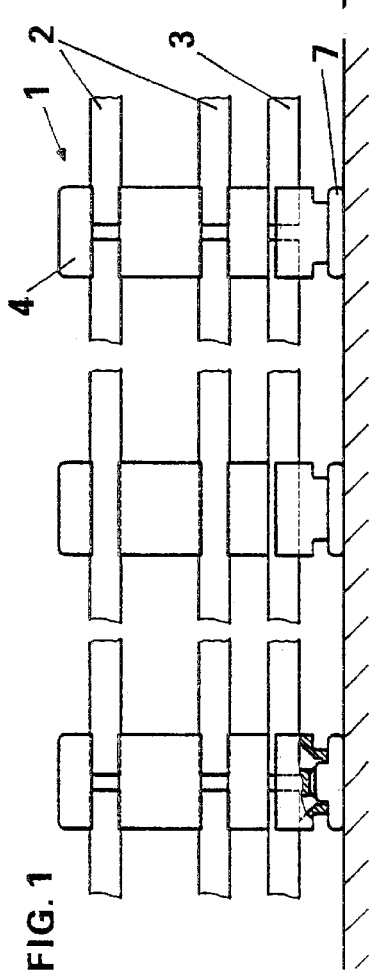
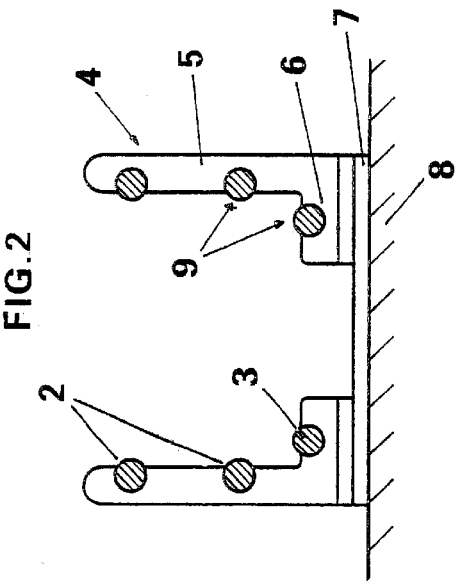
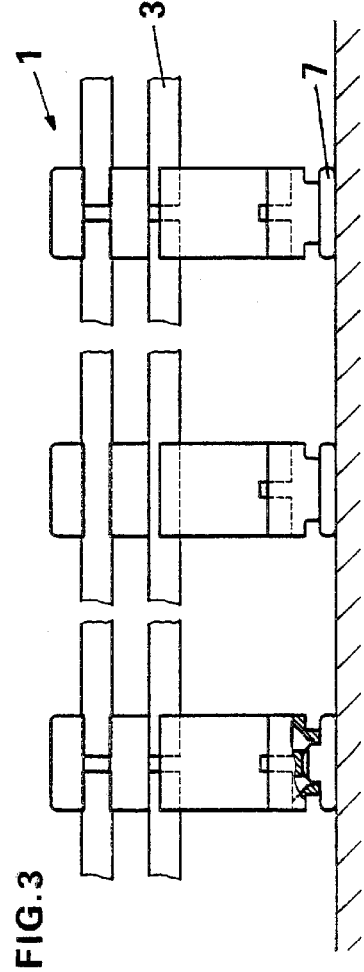
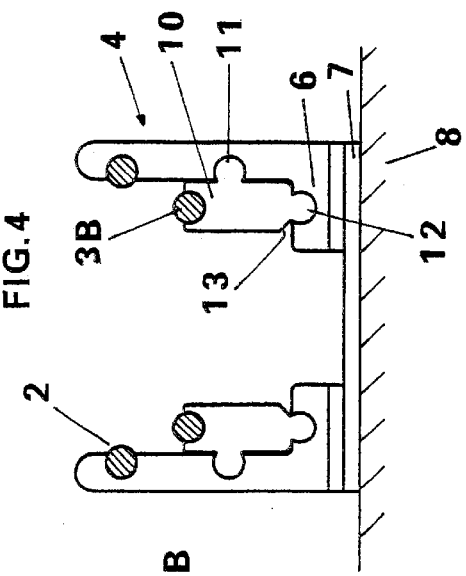

FIG. 8
FIG. 9
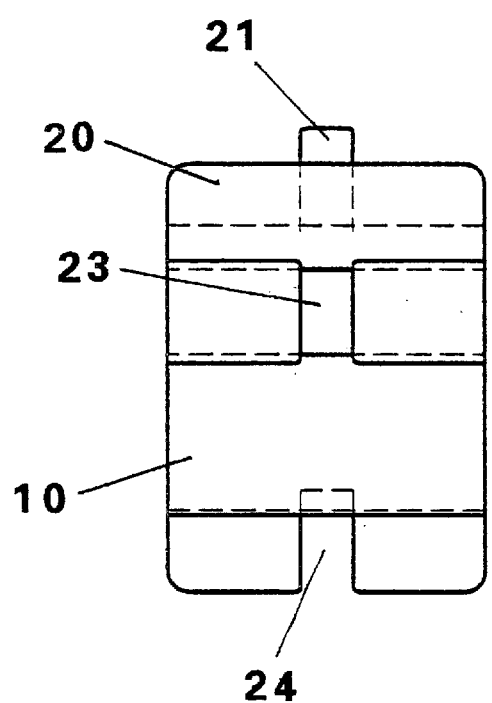
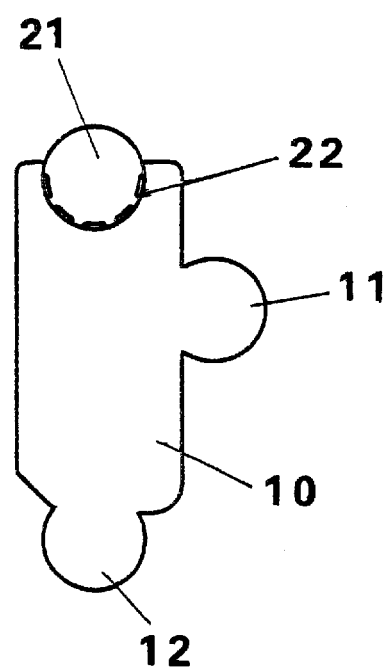

GUIDE CHANNEL

CROSS REFERENCE TO RELATED APPLICATION

This is a continuation of application Ser. No. 09/471,989, filed Dec. 23, 1999, abandoned Feb. 10, 2003.

FIELD OF THE INVENTION

The invention relates to a guide channel for energy guiding chains, which can be mounted on a base structure and has parallel, lateral guide elements extending in the longitudinal direction of the guide channel, between which an energy guiding chain can rest, and bottom guide elements, on which the lower strand of the energy guiding chain can rest.

BACKGROUND OF THE INVENTION

A guide channel of this kind is known from DE 195 12 105 C1, in which the lateral guide elements are designed as legs in the form of continuous side walls. Several recesses are provided on the insides of the legs, in which the projections on sliding rails can be engaged. The bottoms of the legs are provided with wider profiles which enable the legs to be mounted on a base structure and also serve to support the lower strand.

One disadvantage of guide channels of this kind is the comparatively high transport volume, which is primarily determined by the dimensions and rigid design of the side walls of the guide channel. Furthermore, the manufacture of the guide channel is comparatively complex, since the side elements must be given a complex profile. In addition, the known guide channel consists of numerous specially co-ordinated components and can thus only be used as a single modular system.

BRIEF SUMMARY OF THE INVENTION

The object of the invention is to design a guide channel for energy guiding chains which is simple to manufacture and assemble and occupies only a small transport volume.

According to the invention, the object is solved by a guide channel, in which the lateral and/or bottom guide elements are designed as profile rods and in which mounting elements, which can be directly or indirectly mounted on the base structure, are provided, on which the profile rods can be mounted in such a way that they have a section protruding into the inside of the guide channel, by means of which the energy guiding chain can be laterally guided and on which the lower strand can rest.

Due to the fact that the lateral and bottom guide elements of the guide channel consist of separate profile rods, the disassembled guide channel has a comparatively small transport volume. In addition, the guide channel can be manufactured with comparatively little effort as a result, since there is no need for complex profiling of the guide elements.

In particular, the mounting elements can be designed such that profile rods with standardised cross-sections can be mounted on them, i.e. profile rods of the kind known from other technical fields which, for example, are dimensioned in accordance with current DIN, EURO or ASTM standards.

By using profile rods as guide elements, the longitudinal profile of the guide channel can be easily adapted to various requirements and be of both straight and curvilinear design, e.g. arc-shaped guide channels, by bending the profile rods accordingly. As the profile rods can also be shaped on site, the guide channel according to the invention can be used in diverse applications.

The term "profile rods" is particularly intended to mean profiles with an essentially isometric cross-section.

In particular, profile rods with a round, square, triangular or T-shaped cross-section can be used, although this is not a restriction. Depending on availability and the required stability of the guide channel, hollow or solid rods can be used as profile rods. By using standardised profile rods, the local availability of which is virtually unlimited, it is sufficient to just transport the mounting elements, thus minimising the transport volume and transport weight.

Advantageously, the extension of each of the profile rods over the height of the guide channel is comparatively small in comparison to the height of the guide channel itself, for example less than ¼ or less than ⅛ of the height of the guide channel. Accordingly, the guide channel preferably merely is built up by small guide elements or profile rods, respectively, which do not extend over the entire height of the guide channel but only over small sections of the guide channel.

Advantageously, the distance of the profiled rods in the vertical direction over the height of the guide channel is larger than the height of the profiled rods in this direction itself, advantageously a multiple thereof, for instance corresponding to the twice or forth height of the profiled rods or even more.

Advantageously, the guide channel is built up by a multiple of profiled rods distributed over the cross section of the guide channel. Preferably, a multiple of profiled rods arranged vertically above each other, for instance two of them, build up a side wall of the guide channel, whereby also the bottom region of the channel is provided with separate profiled rods.

Another advantage of the guide channel according to the invention results from the fact that only the sections of the profile rods which protrude into the inside of the guide channel act as guide areas, the extension of which into the guide channel is small relative to their diameter, amounting to less than ½ to ⅕ of the diameter, for example, although without restriction to this. The respective guide or contact surfaces for the energy guiding chain are thus also of small dimensions.

The profile rods can be made of metal or plastic, where the combination of metal and plastic is particularly advantageous with regard to the energy guiding chain.

The dimensions of the mounting elements are advantageously small compared to the length of the profile rods or compared to the length of the chain links of the energy guiding chain. For example, the mounting elements can have a width of a few centimeters, while the length of the profile rods amounts to several meters, thus resulting in a guide channel of very low weight and transport volume. If the profile rods are of corresponding length, mounting elements can, of course, be provided not only in the end region, but also in the middle region of the profile rods, in order to ensure sufficient stability of the guide channel.

The mounting elements can be spaced apart from one another or also in contact at the face ends, thus resulting in a closed guide channel.

The mounting elements can be designed in such a way that continuous guidance is provided by the profile rods alone, or by the profile rods and the mounting elements connecting them, preferably without any differences in height in the guide and contact area.

The mounting elements can be provided with additional fastening devices for plate-like wall and/or floor elements, which can be mounted on the front or side of the mounting elements, so that a closed guide channel can be constructed with little effort. In particular, the fastening devices can be designed in such a way that metal plates of standardised thickness or profile sections can be used as side wall elements or floor elements.

In order to mount the profile rods, recesses which are open towards the inside of the guide channel can be provided on the mounting elements, in which the profile rods can be arranged. The cross-sectional contour of the recesses can be adapted to that of the profile rods.

The recesses are advantageously provided with undercuts for securing the profile rods, by means of which profile rods arranged in the recesses can be mounted in positive fashion. Thus, the profile rods can, for example, be secured by simply being snapped into the mounting elements.

In addition, the profile rods can be secured on the mounting elements in such a way that they cannot shift in the longitudinal direction. For this purpose, the mounting areas of the profile bars can be secured on the mounting elements in non-positive fashion. In particular, the recesses open towards the inside of the guide channel can be dimensioned in such a way that the profile rods can be inserted into the recesses in the longitudinal direction, forming a non-positive connection. In this way, the profile rods can be pre-assembled on the mounting elements, thus simplifying assembly of the guide channel.

The bottom mounting element, which can be provided with fastening devices for securing the guide channel on a base structure, is advantageously integrally moulded on the lateral mounting elements.

In order to provide a support for the upper strand of the energy guiding chain, adapters can be provided, which are arranged inside the guide channel and can be mounted on the lateral and/or bottom mounting elements and/or the profile rods. The upper strand of the energy guiding chain can rest indirectly or directly on the adapters.

The adapters are advantageously designed such that profile rods can be mounted on them in such a way that the upper strand of the energy guiding chain can rest on the top side of the profile rods. A continuous support for the upper strand can be provided by the profile rods alone, or by the profile rods and adapters together.

In order to mount the adapters, they are advantageously provided with a projection which can be inserted into a corresponding recess of a lateral or bottom mounting element, where the adapter is designed such that, when the projection of the adapter is positioned in the corresponding recess of the mounting element, it can be pivoted from its initial position, e.g. an inclined position, into its final position. This provides for the simple securing of the adapter. In particular, further fastening devices can be provided which can be brought into contact with the vertically positioned adapter, preferably on the other of the two mounting elements.

The mounting area of the adapter and/or of the mounting element for the profile rods can have an area against which the front of the profile rods can be placed. This simplifies the pre-assembly of the guide channel. In particular, the contact area can be designed as a projection, against both sides of which the fronts of profile rods can be placed and whose cross-section corresponds to that of the profile rods.

The contact area or projection can have a predetermined breaking point which is positioned such that, after removing the adapter or mounting element, a profile rod can be guided continuously over the respective mounting area. Preferably, the profile rod can be mounted on the adapter or mounting element in non-positive and/or positive fashion after the contact area has been removed. Thus, the respective components can, for example, be used both as end pieces for the guide channel and also in the centre region of the guide channel, so that special end pieces are not required.

The mounting elements, particularly those at the bottom, can be provided with fastening elements for mounting on the base structure.

Separate fastening elements are advantageously provided, which extend over the width of the guide channel and on which opposing mounting elements can be mounted. The fastening elements can be designed as legs, for example, and enable the longitudinal displacement of the mounting elements.

The ends of the fastening elements are advantageously provided with two separated fastening devices for mounting the fastening elements on the base structure, where one of the fastening devices can be positioned at the height of, or on, the side of the bottom mount facing away from the inside of the guide channel and the other fastening device can be positioned on the side of the lateral mounting element facing towards the inside of the guide channel. This enables particularly stable mounting on the base structure, particularly if the width of the bottom mounting element can be adjusted in order to adapt to energy guiding chains of different widths. In order to allow the width to be adjusted, the fastening element can be of telescoping design, for example, or divided by an irreversible separation, for which purpose a predetermined breaking point can be provided.

The present invention further relates to mounting elements for mounting lateral and/or bottom guide elements and adapters for constructing the guide channel according to the invention.

BRIEF DESCRIPTION OF THE DRAWINGS

The invention is described below on the basis of a practical example and illustrated by way of example based on the figures. The figures show the following:

FIG. 1 A side view of a guide channel according to the invention,

FIG. 2 A cross-section of the guide channel shown in FIG. 1,

FIG. 3 A side view of a guide channel according to the invention with adapters,

FIG. 4 A cross-section of the guide channel shown in FIG. 1,

DETAILED DESCRIPTION OF THE DRAWINGS

Figure 5:
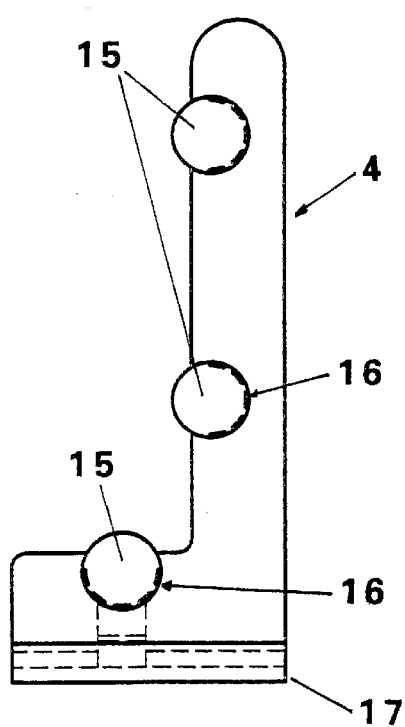
FIG. 5 A front view of a mounting element of a guide channel according to FIG. 1, FIG. 6 A side view of the mounting element shown in FIG. 5, FIG. 7 A top view of the mounting element shown in FIG. 5, FIG. 8 A side view of a an adapter according to FIG. 2, FIG. 9 A front view of the adapter shown in FIG. 8, FIG. 10 A side view of a mounting strip for mounting the mounting elements on a base structure.

Guide channel 1 according to FIGS. 1 to 3 consists of round profile rods 2 as lateral guide elements and bottom round profile rods 3 to support the lower strand of an energy guiding chain (not shown). Profile rods 2, 3 are held in place by L-shaped mounting elements 4, whose long, vertical legs 5 form a mount for lateral profile rods 2 and whose short, horizontal legs 6 form a mount for bottom profile rods 3.

Profile rods 2, 3 are each snapped into arc-shaped recesses 14 (see FIGS. 6 and 7) of mounting elements 4 and thus mounted in them in positive fashion. In this context, the diameter of the recesses of mounting elements 4 is dimensioned such that profile rods 2, 3 are simultaneously fixed in non-positive fashion and thus secured against shifting relative to mounting elements 4.

Mounting elements 4, positioned opposite one another, are each fixed by way of snapping elements on a mounting strip 7, which extends over the width of the guide channel and is screwed onto base 8.

In the practical example, mounting elements 4 and mounting strips 7 are made of plastic injection moldings, which profile rods 2, 3 are 12 mm diameter round metal rods.

Profile rods 2, 3 each have a section 9 protruding from mounting elements 4 into the inside of guide channel 1, which can come into contact with the energy guiding chain during travel and thus forms a support or lateral guide for the energy guiding chain.

As shown in FIGS. 1 to 4, mounting elements 4 can hold profile rods 2, 3 in a middle area or the end area, where, in the latter case, the mounting elements simultaneously serve as connecting elements for adjacent profile rods.

As shown in FIGS. 3 and 4, adapters 10 are provided, the side of which facing away from base 8 holds profile rods 3B, on which the upper strand of the energy guiding chain can rest. The cross-section of profile rods 3B and the contour of the corresponding recesses on adapter 10 match those of profile rods 2, 3 and the recesses on mounting elements 4.

Adapters 10 are mounted in positive fashion on the lateral and bottom area of mounting elements 4 by way of integrally molded projections 11, 12.

A chamfer 13 facing towards the inside of guide channel 1 is provided next to projection 12 positioned on the bottom of adapter 10. In order to mount adapter 10, it can first be snapped in an inclined position into the bottom area of mounting element 4 by downward-facing projection 12, where chamfer 13 is in contact with horizontal leg 6 of mounting element 4, and adapter 10 is then pivoted until lateral projection 11 snaps into the corresponding recess in leg 5.

Figure 6:
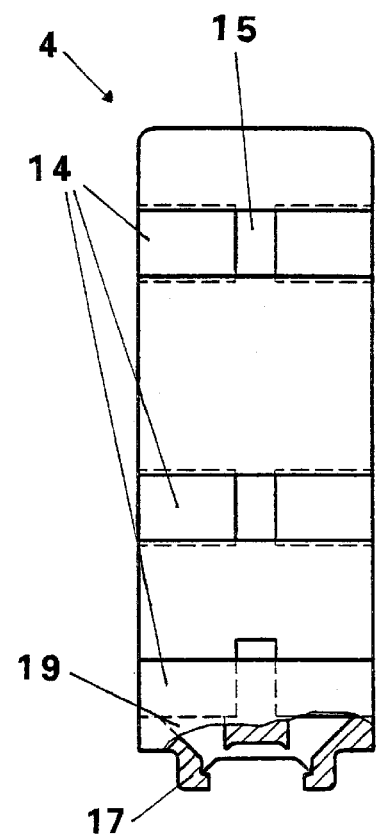
Figure 7:
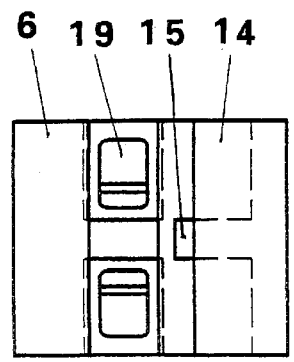

As shown in FIGS. 6 and 7, in order to accept profile rods 2, 3, recesses 14 on the mounting elements are divided by cylindrical projections 15 positioned in the center plane of mounting elements 4, the two face ends of which serve as contact surfaces for the face ends of the corresponding profile rods 2, 3. In order to assemble guide channel 1, profile rods 2, 3 can thus be inserted into recesses 14 in the longitudinal direction until they run up against projection 15.

In order to mount profile rods 2, 3 in an area a distance away from the ends, projections 15 can be broken off in areas 16 due to the thinning of the material caused by profiling, thus forming continuous recesses in the longitudinal direction.

Figure 11:
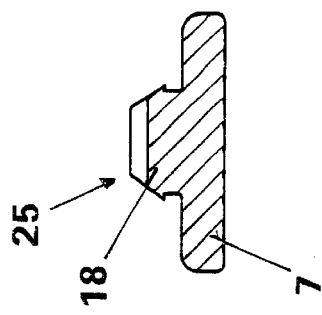
FIG. 11 A cross-section along the line XI-XI in FIG. 10.

Snap projections 17 are provided on the bottom of mounting elements 4, which can be used to snap mounting elements 4 onto corresponding lugs 18 on mounting strips 7 (see FIG. 11). In order to facilitate disassembly of mounting elements 4, holes 19 are provided on legs 6, into which a suitable tool can be inserted and positioned on the web remaining between the holes in order to pry off mounting elements 4.

As shown in FIGS. 8 and 9, recess 20 of adapters 10 for the non-positive and positive acceptance of profile rods 3B also has a cylindrical projection 21, against which the face ends of the profile rods can be positioned and which is mounted on adapter 10 via a thinner area of material 22. Projections 11, 12 of adapter 10 have recesses 23, 24 at the height of projection 21, into which projections 15 on legs 5, 6 of mounting elements 4 can be inserted, so that the adapter can be secured against displacement on the mounting element.

Figure 10:
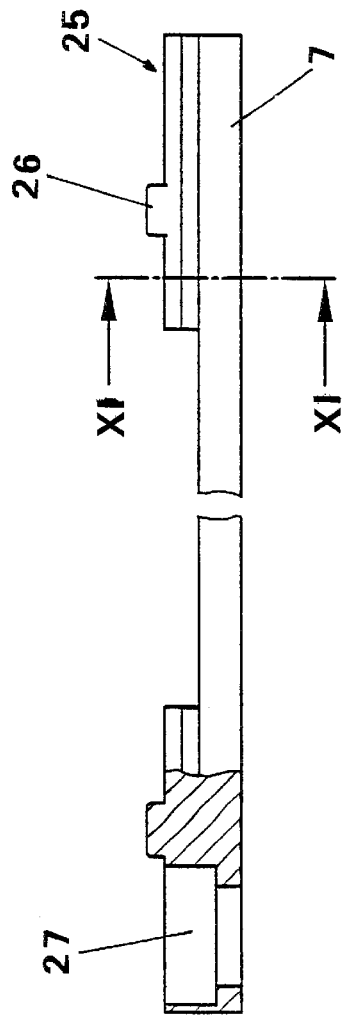
Figure 12:
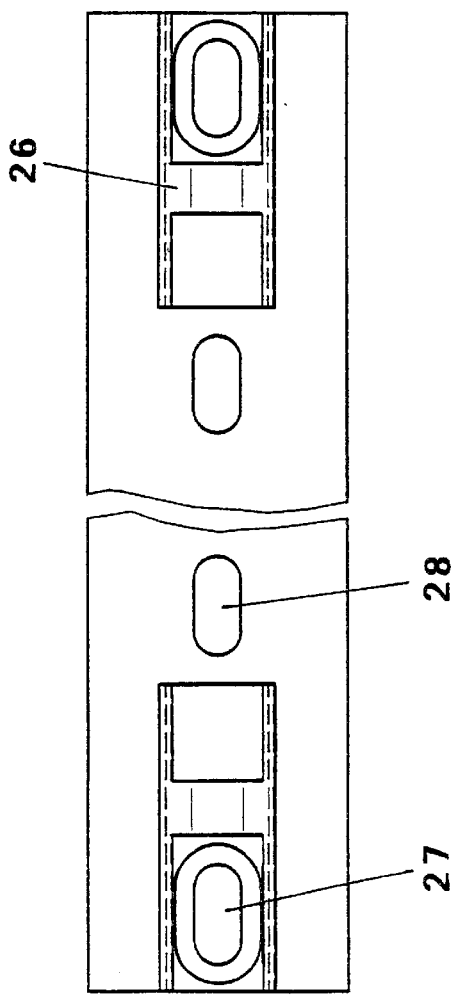
FIG. 12 A top view of the mounting strip shown in FIG. 10.

As shown in FIG. 10, both ends of mounting strip 7 have projections 25, which are provided with lugs 18 and the top of which is provided with a web 26, which can be inserted into a corresponding recess in leg 6 of mounting elements 4.

Stepped bore holes 27 are provided on the ends of mounting strips 7, through which studs can be inserted in order to fasten mounting strip 7 to a base. After assembly of mounting elements 4, stepped bore holes 27 are covered by vertical legs 6 of the mounting elements.

Mounting strip 7 is also provided with through-holes 28 spaced further away from the ends of the mounting strip. If mounting strip 7 is divided in the centre in order to adapt the guide channel to wider energy guiding chains, the two resulting mounting elements each have two mounting areas in the form of through-holes 27, 28, so that they can each be mounted independently of one another on base 8 in secure and non-twisting fashion.

List of Reference Numbers

| | |
|---|---|
| 1 | Guide channel |
| 2, 3, 3B | Profile rod |
| 4 | Mounting element |
| 5, 6 | Leg |
| 7 | Mounting strip |
| 8 | Base |
| 9 | Section |
| 10 | Adapter |
| 11, 12 | Projection |
| 13 | Chamfer |
| 14 | Recess |
| 15 | Projection |
| 16 | Thinner area of material |
| 17 | Snap projection |
| 18 | Lug |
| 19 | Hole |
| 20 | Recess |
| 21 | Projection |
| 22 | Thinner area of material |
| 23, 24 | Recess |
| 25 | Projection |
| 26 | Web |
| 27 | Stepped bore hole |
| 28 | Through-hole |

What is claimed is:

1. A mounting element for a guide channel, comprising:
a mounting portion adapted to be mounted on a base;
at least one horizontal leg, arranged in use to transverse the bottom of the channel, and defining at least one upwardly-open recess; and
at least one vertical leg extending upwards from an end of said at least one horizontal leg, defining at least one recess laterally open on a side of the leg towards the at least one upwardly-open recess;
wherein said recesses are arranged to receive rods extending horizontally in a lengthwise direction, perpendicular to said vertical and horizontal legs, with said rods protruding from said mounting elements into a space bounded by said legs, said rods and said mounting elements defining said channel.

2. A mounting element according to claim 1, wherein the recesses are provided with undercuts, by means of which the rods can be retained within the recesses.

3. A mounting element according to claim 1, wherein said at least one vertical leg and said at least one horizontal leg are integrally molded on one another.

4. A mounting element according to claim 1, comprising two said vertical legs, and one said horizontal leg extending from each said vertical leg towards another said vertical leg.

5. A mounting element according to claim 1, which defines at least two laterally-open recesses, one vertically above the other.

6. A mounting element according to claim 1, wherein the recesses have a contact area against which the ends of the rods can be placed.

7. The mounting element according to claim 6, wherein the contact areas have a predetermined breaking point which is positioned such that, after removing the contact area, the rod can be guided through the recess to extend to both sides of the mounting element.

8. In combination, a bottom fastening element which has a fastening device for mounting on a base, and two mounting elements each said mounting element comprising:
   a horizontal leg defining at least one upwardly-open recess; and
   a vertical leg extending upwards from an end of said horizontal leg, defining at least one recess laterally open on a side of the leg towards said at least one upwardly-open recess;
   wherein said mounting elements are adapted to be mounted on the bottom fastening element with their horizontal legs extending towards each other; and
   wherein said recesses are arranged to receive rods extending horizontally in a direction perpendicular to said vertical and horizontal legs, with said rods protruding from said mounting elements into a space bounded by said legs, said rods and said mountine elements defining a guide channel.

9. In combination, a plurality of profile rods and a plurality of mounting elements for a guide channel, each mounting element comprising:
   a fastening portion adopted to be mounted on a base;
   at least one horizontal leg, defining at least one upwardly-open recess; and
   at least one vertical leg extending upwards from an end of said at least one horizontal leg, defining at least one recess laterally open on a side of the leg towards the at least one upwardly-open recess;
   wherein said recesses are arranged to receive said profile rods extending horizontally in a direction perpendicular to said vertical and horizontal legs, with said profile rods protruding from said mounting elements into a space bounded by said legs;
   wherein said plurality of mounting elements are spaced apart in a longitudinal direction of said profile rods to support said profile rods;
   wherein said recesses are dimensioned to secure the profile rods against shifting in a longitudinal direction;
   whereby said profile rods, on said mounting elements, define the guide channel.

10. A guide channel for energy-guiding chains, comprising:
    mounting elements that are spaced apart lengthwise of the chain and are adapted to be mounted on a supporting surface, said mounting elements comprising:
       fastening portions adapted to be mounted on a base structure;
       horizontal legs transversing the bottom of said guide channel and defining upwardly-open recesses; and
       vertical legs extending upwards to both sides of said horizontal legs and defining recesses laterally open towards the opposing vertical legs; and
    bottom and lateral guide elements comprised of profile rods received in said recesses, each said profile rod extending longitudinally and received in corresponding said recesses of a plurality of said mounting elements, with said profile rods protruding from said recesses into a space bounded by said legs and defining between them a guide channel for the chain; and
    wherein said recesses are dimensioned to secure the profile rods against shifting in a longitudinal direction.

11. A guide channel according to claim 10, wherein the rods are round in cross section.

12. A guide channel according to claim 10, wherein the dimensions of the mounting elements in the longitudinal direction of the guide channel are small compared to the length of the rods.

13. A guide channel according to claim 10, wherein the recesses are provided with undercuts, by means of which the rods are retained within the recesses.

14. A guide channel according to claim 10, wherein one of said vertical and a one of said horizontal leg of a mounting element are integrally molded on one another.

15. A guide channel according to claim 10, wherein adapters are provided, which can be arranged inside the guide channel and by which an upper strand of the energy guiding chain can be supported.

16. A guide channel according to claim 15, wherein the adaptors are provided wit upwardly-open recesses, in which said rods are mounted such that the upper strand of an energy guiding chain can rest on those rods.

17. A guide channel according to claim 15, wherein the adapter has at least one projection which can be inserted into a corresponding recess of the mounting element and wherein the adapter is designed such that, when the projection is positioned in the corresponding recess of the mounting element, it can be pivoted from its initial position into its final position.

18. A guide channel according to claim 10, wherein the recesses have a contact area against which the ends of the rods can be placed.

19. A guide channel according to claim 18, wherein the contact area has a predetermined breaking point which is positioned such that, after removing the contact area, said profile rod can be guided trough the recess.

20. A guide channel according to claim 10, wherein bottom fastening elements are provided, on which opposing mounting elements can be mounted, and which have fastening devices for mounting on the base.

21. A guide channel according to claim 10, wherein each end of each of the fastening portions is provided with two separated fastening devices for mounting on the base structure.

* * * * *